United States Patent
Dirren

(10) Patent No.: US 7,527,818 B2
(45) Date of Patent: May 5, 2009

(54) METHOD FOR PRODUCING MILK FOAM OR WARM MILK DRINKS

(75) Inventor: Francoise Dirren, Sion (CH)

(73) Assignee: Steiner AG, Weggis, Weggis (CH)

( * ) Notice: Subject to any disclaimer, the term of this patent is extended or adjusted under 35 U.S.C. 154(b) by 609 days.

(21) Appl. No.: 11/095,546

(22) Filed: Apr. 1, 2005

(65) Prior Publication Data

US 2005/0233043 A1 Oct. 20, 2005

(51) Int. Cl.
*A23C 9/00* (2006.01)

(52) U.S. Cl. ............... 426/474; 426/580; 426/590; 426/476; 426/477

(58) Field of Classification Search ......... 426/580, 426/590, 474, 476, 477
See application file for complete search history.

(56) References Cited

U.S. PATENT DOCUMENTS

| | | | | |
|---|---|---|---|---|
| 4,620,953 A * | 11/1986 | Silla et al. | ............ | 261/142 |
| 5,862,740 A * | 1/1999 | Grossi | ............ | 99/293 |
| 5,957,033 A * | 9/1999 | In-Albon | ............ | 99/284 |
| 6,099,878 A * | 8/2000 | Arksey | ............ | 426/231 |
| 7,225,727 B2 * | 6/2007 | Oldani et al. | ............ | 99/293 |

* cited by examiner

*Primary Examiner*—Anthony Weier
(74) *Attorney, Agent, or Firm*—Wenderoth, Lind & Ponack, L.L.P.

(57) ABSTRACT

A method and a device for producing milk foam or warm milk drinks, whereby milk is suctioned from a container (1) by means of a pump (2) and conveyed to an outlet (8). The milk is routed through a continuous-flow heater (4) during suctioning and heated, whereafter the same is conveyed to an outlet (8) via a throttle point (9). In this way extremely digestible milk foam can be produced in a simple way when air or a gas is added to the milk.

16 Claims, 2 Drawing Sheets

METHOD FOR PRODUCING MILK FOAM OR WARM MILK DRINKS

BACKGROUND OF THE INVENTION

The invention concerns a method for producing milk foam or warm milk drinks as well as a device for applying the method.

A device for producing milk foam is known from EP-A 0 600 826, whereby the milk is filled into a container and heated therein, whereafter the heated milk is suctioned via a suction line by means of a pump, whereby air is added to the heated milk in controllable amounts. With the aid of the pump, the milk, i.e., the milk/air mixture is then conveyed through a resistance flow element to an outlet. The container in which the milk is heated must be cleaned regularly due to a build-up of residue. The relatively complicated resistance flow element also requires thorough and quite complex cleaning measures.

SUMMARY OF THE INVENTION

It is the purpose of this invention to provide a method of the type described above as well as a simple and cost-effective device for applying the method that will enable simple operation and maintenance.

The fact that according to the invention the milk is not heated in a special container as is usual today, but routed through a continuous-flow heater and heated within the same, means that the milk can be suctioned in a cold condition directly from practically any container without having to transfer the same into the special container for heating. The container can simply be replaced when the milk has been used. If the same consists of a refillable container the cleaning of the same is simple, as no residue will build up due to a lack of heating within the same.

A further advantage consists of the fact that no expensive and maintenance intensive resistance flow element is required, but that the heated milk, i.e. the milk/air (gas) mixture is merely conveyed via a throttle point to the outlet. The continuous-flow heater can be cleaned without problem.

With an especially preferred method, the air is added to the cold milk prior to the same entering the continuous-flow heater, and the milk/air, i.e. gas mixture is warmed in the continuous-flow heater to a desired adjustable temperature, whereby an excellent milk foam quality can be created. It is of special advantage if an adjustable throttle valve is used at the throttle point with which the pressure can be adjusted according to requirements.

BRIEF DESCRIPTION OF THE DRAWINGS

The invention will now be described with reference to the drawings, whereby.

DETAILED DESCRIPTION OF THE INVENTION

Figure 1:
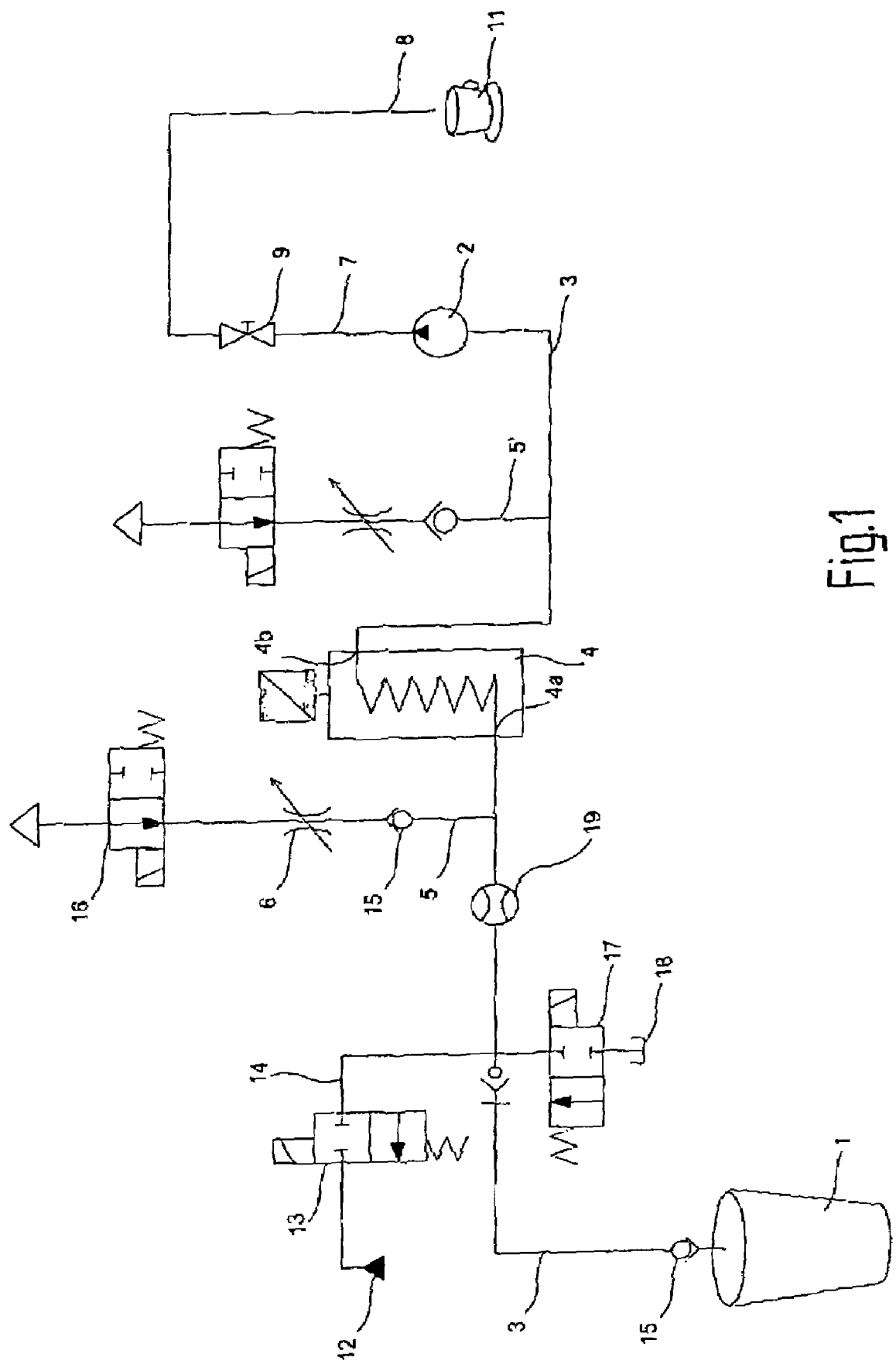
FIG. 1 is a schematic illustration of a device of this invention for producing milk foam or warm milk drinks.
Figure 4:
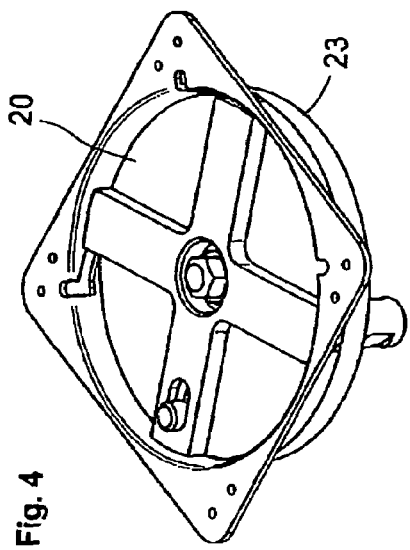
FIG. 4 is a perspective illustration of the continuous-flow heater shown in FIG. 2 in its installed condition.
Figure 5:
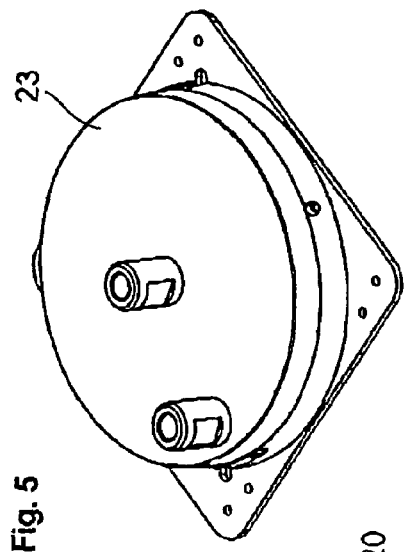
FIG. 5 is a perspective view of the assembled continuous-flow heater with its lower side shown in FIG. 4 uppermost.

FIG. 1 shows a container 1 with milk, which can if desired also contain various additives such as chocolate, vanilla and the like. The cold milk is suctioned from the container 1 via a suction line 3 by means of a pump 2, whereby the same flows through a continuous-flow heater 4 and is heated in the same. The inlet into the continuous-flow heater 4 has been denoted by the reference number 4a in FIG. 1, and the outlet the reference number 4b.

Prior to the inlet 4a into the continuous-flow heater 4, an air supply line 5 opens into the suction line 3, to which an adjustable air quantity controller 6 is assigned. It is however also possible to use a fixed nozzle instead of this controller 6. A certain quantity of air can be added to the milk via the air supply line 5, whereby the milk/air mixture (or the milk alone) is then suctioned by the pump 2 and heated in the continuous-flow heater 4. In principle it is also possible to use a gas mixture instead of air.

An activating valve 16, with which the air supply can be stopped especially when only hot milk without foam is to be produced and dispensed, is further envisaged in the air supply line 5. The air supply line 5' with the relevant valves could in principle also be positioned after the continuous-flow heater as illustrated with the aid of the broken line.

In the continuous-flow heater 4, the milk, i.e. the milk/air mixture, is routed through a line arranged in spiral or another form and heated by means of a heating element, which can take various forms such as for example that of a resistance flow element. The temperature of the heating element can preferably be controlled so that the temperature of the milk, i.e. the milk/air mixture that is desired at the outlet 4b can be controlled.

With the aid of the pump 2, the milk, i.e. the milk/air mixture, is then pumped to an outlet 8 via an outlet line 7, namely via a throttle point, which can either take the form of an adjustable or a fixed throttle valve 9, and which creates an overpressure within the hydraulic system. With the adjustable throttle valve 9 the pressure can preferably be set to between 0 and 15 bar. The milk foam or the warm milk drink produced in this way is then captured in a container 11, for example, a cup.

For the cleaning of the continuous-flow heater 4 and the relevant lines cleaning fluid can be introduced from a source 12 via a cleaning valve 13 and a line 14 into the suction line 3 and pumped into the outlet line 7 by means of the pump 2. The cleaning of the continuous-flow heater 4 is substantially simpler than the cleaning of a conventional resistance flow element. Preferably a certain quantity of water is pumped through the line 3 after each flow of milk, so that a settling of milk residue can be prevented, especially in the continuous-flow heater 4.

The fact that according to the invention the milk is not heated in a special container as is usual, but suctioned through the continuous-flow heater 4 and heated within the same, means that the milk can be suctioned in a cold condition directly from practically any container 1 without having to transfer the same into the special container for heating. The container 1 can simply be replaced when the milk has been used. If the same consists of a refillable container the cleaning of the same is simple, as no residue will build up due to a lack of heating within the same. A further advantage consists of the fact that no expensive and maintenance intensive resistance flow element is required.

The air (which could also be a gas) required for producing the milk foam could be added to the milk only after the outlet 4b from the continuous-flow heater 4. The adding of air to the cold milk prior to entry into the continuous-flow heater 4 is however of special advantage, as the milk/air mixture can be heated to the desired, adjustable temperature in the continuous-flow heater 4 in a controlled way, whereby an excellent milk foam quality can be produced. Of special advantage is also the use of the adjustable throttle valve 9 at the throttle point, with which the pressure can be adjusted according to requirements.

In addition a valve 17 taking the form of a two-way valve with a catchment container or a drain 18 is located at the start of the suction line 3, through which an emptying of the water in the suction line 3 is possible. Various non-return valves 15 within the system prevent a backflow of milk, i.e. air or gas.

Figure 3:
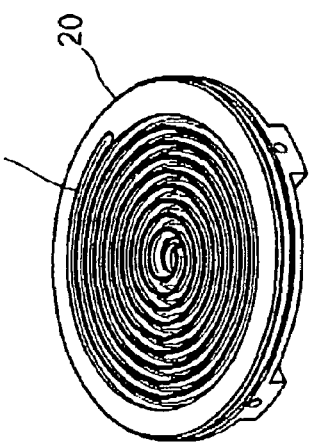
FIG. 3 is a perspective illustration of a part of the continuous-flow heater shown in FIG. 2.
Figure 2:
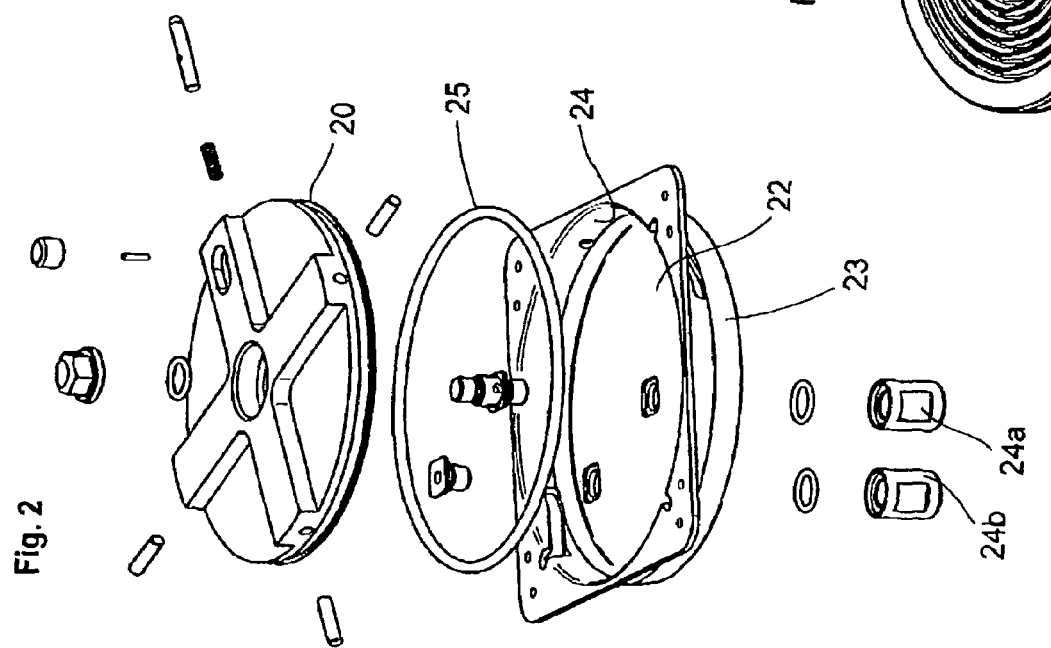
FIG. 2 is an exploded illustration of an embodiment of a continuous-flow heater for the device shown in FIG. 1.

In FIGS. 2 to 5 an especially advantageous embodiment of the continuous-flow heater 4 is illustrated, in which the milk, i.e. the milk/air mixture, is routed through a spiral-shaped channel which is formed between a labyrinth disc 20 that is visible especially clearly in FIG. 3 and equipped with a facing side spiral-shaped groove 21 and a facing side heater surface 22 of a heater element 23. The facing side heater surface 22 forms a part of a recess 24 within the heater element 23, in which the labyrinth disc 20 with the spiral-shaped groove 21 is inserted in a downward sealing way (a sealing ring 25 is illustrated in FIG. 2, in which the bayonet type connection between labyrinth disc 20/heater element 23 is also indicated).

The spiral-shaped channel is sealingly connected within the recess 24 with connectors 24a, 24b which are associated with the heater element 23 during insertion of the labyrinth disc 20, whereby the centrally located connector 24a preferably forms the inlet 4a, and the connector 24b, which is associated with the outer end of the groove 21, forms the outlet 4b or vice versa for the milk, i.e. the milk/air mixture.

It is quite possible that the spiral-shaped groove is envisaged in the heater element and that the same is covered by a flat disc in order to form the spiral-shaped channel. It is also possible that the channel could be formed by spiral-shaped grooves in both continuous-flow heater sections (labyrinth disc, heater element). It would also be possible to locate the connectors forming the inlet and outlet for the milk, i.e. the milk/air mixture, in the cover, i.e. the labyrinth disc instead of the heater element. Finally it would be possible that both continuous-flow heater sections, which together form the spiral-shaped channel, take on a different form such as the one illustrated in FIGS. 2 to 5.

The invention claimed is:

1. A method for producing milk foam or warm milk drinks, the method comprising:
   suctioning milk from a container into a suction line by means of a pump disposed in the suction line;
   injecting a controllable quantity of air, via an air supply line, into the suction line to form a milk/air mixture;
   heating the milk/air mixture by conveying the milk/air mixture through a continuous-flow heater which is disposed in the suction line, wherein the pump is disposed in the suction line downstream of the continuous flow heater; and
   conveying, directly from the pump, the heated milk/air mixture via a throttle point to an outlet.

2. The method according to claim 1, wherein the air is added to the milk upstream of an inlet into the continuous-flow heater.

3. The method according to claim 1, wherein the milk/air mixture is heated by the continuous-flow heater which has a labyrinth form and is equipped with a heater element whose temperature is controllable, so that the temperature of the milk/air mixture at the outlet of the continuous-flow heater can be adjusted.

4. The method according to claim 1, wherein the throttle point is formed by a throttle valve or a fixed nozzle.

5. The method according to claim 1, wherein the throttle point is formed by an adjustable throttle valve.

6. The method according to claim 1, wherein the continuous-flow heater comprises a spiral-shaped channel formed by two separable parts, wherein one of the parts includes a heater element.

7. The method according to claim 6, wherein the spiral-shaped channel includes a central inlet and an outer peripheral outlet.

8. The method according to claim 6, wherein one of the two parts takes the form of a labyrinth disc provided with a spiral-shaped groove, and the other of the two parts includes a heater element defining a recess into which the one part is received.

9. A method for producing milk foam or warm milk drinks, the method comprising:
   suctioning milk from a container into a suction line by means of a pump disposed in the suction line;
   heating the milk by conveying the milk through a continuous-flow heater which is disposed in the suction line;
   injecting a controllable quantity of air, via an air supply line, into the suction line to form a heated milk/air mixture, wherein the air is injected into the suction line at an injection point located downstream of the continuous-flow heater, and the pump is disposed downstream of the air injection point; and
   conveying, directly from the pump, the heated milk/air mixture via a throttle point to an outlet.

10. The method according to claim 9, wherein the air is added to the heated milk downstream of the continuous-flow heater outlet.

11. The method according to claim 9, wherein the milk is heated by the continuous-flow heater which has a labyrinth form and is equipped with a heater element whose temperature is controllable, so that the temperature of the milk at the outlet off the continuous-flow heater can be adjusted.

12. The method according to claim 9, wherein the throttle point is formed by a throttle valve or a fixed nozzle.

13. The method according to claim 9, wherein the throttle point is formed by an adjustable throttle valve.

14. The method according to claim 9, wherein the continuous-flow heater comprises a spiral-shaped channel formed by two separable parts, wherein one of the parts includes a heater element.

15. The method according to claim 14, wherein the spiral-shaped channel includes a central inlet and an outer peripheral outlet.

16. The method according to claim 14, wherein one of the two parts takes the form of a labyrinth disc provided with a spiral-shaped groove, and the other of the two parts includes a heater element defining a recess into which the one part is received.

* * * * *